United States Patent
Maino et al.

[11] Patent Number: 6,019,310
[45] Date of Patent: Feb. 1, 2000

[54] METHOD OF MONITORING ON THE BASIS OF SIGNAL ENERGY A TRANSMISSION ASSEMBLY OF A VEHICLE EQUIPPED WITH ACCELERATION SENSORS IN PARTICULAR A HELICOPTER

[75] Inventors: Bruno Maino, Samarate; Alberto Bellazzi, Cameri, both of Italy

[73] Assignee: Finmeccanica S.p.A., Rome, Italy

[21] Appl. No.: 09/110,307

[22] Filed: Jul. 6, 1998

[30] Foreign Application Priority Data

Jul. 4, 1997 [IT] Italy .................................. TO97A0593

[51] Int. Cl.[7] .................................................. B64C 11/34
[52] U.S. Cl. ........................ 244/17.13; 244/60; 180/337; 180/338
[58] Field of Search .................. 244/17.13, 39, 244/60; 180/337, 338

[56] References Cited

U.S. PATENT DOCUMENTS

| | | | |
|---|---|---|---|
| 3,699,806 | 10/1972 | Weichbrodt | 73/71.4 |
| 4,632,337 | 12/1986 | Moore | 244/60 |
| 5,210,704 | 5/1993 | Husseiny | 364/551.01 |
| 5,365,787 | 11/1994 | Hernandez et al. | 73/60 |

FOREIGN PATENT DOCUMENTS

WO 96/05486  2/1986  WIPO .

*Primary Examiner*—J. Woodrow Eldred
*Attorney, Agent, or Firm*—Darby & Darby

[57] ABSTRACT

The method includes the steps of: acquiring a signal from an acceleration sensor; calculating the Fourier transform in the frequency domain of the signal to obtain a sequence of samples; acquiring from the sequence of samples a set of samples including samples at the meshing frequency of the gears monitored by the sensor, and samples at the harmonic frequencies of the meshing frequency; calculating the energies associated with the set of samples and the signal; calculating a noise energy parameter correlated to the ratio between the energy of the set of samples and the energy of the signal; comparing the noise energy parameter with at least one predetermined threshold; and generating an alarm signal in the event the noise energy parameter exceeds the threshold value.

12 Claims, 5 Drawing Sheets

METHOD OF MONITORING ON THE BASIS OF SIGNAL ENERGY A TRANSMISSION ASSEMBLY OF A VEHICLE EQUIPPED WITH ACCELERATION SENSORS IN PARTICULAR A HELICOPTER

BACKGROUND OF THE INVENTION

The present invention relates to a method of monitoring, on the basis of signal energy, a transmission assembly of a vehicle equipped with acceleration sensors, in particular a helicopter.

As is known, helicopter transmission members must be monitored continuously to immediately detect any faults or incipient malfunction conditions, and so prevent failure during flight.

For this purpose, the transmission is equipped with acceleration sensors, the signals of which are processed to determine any faults on the transmission. The methods currently used, however, to process the fault detection sensor signals are not sensitive enough to ensure fault detection well in advance of catastrophic failure.

SUMMARY OF THE INVENTION

It is an object of the present invention to provide a monitoring method ensuring reliable, advance detection of any faults or malfunction conditions which might result in failure.

According to the present invention, there is provided a method of monitoring, on the basis of signal energy, a transmission assembly of a vehicle equipped with acceleration sensors, in particular a helicopter, characterized by comprising the steps of:

a) acquiring a signal from an acceleration sensor;

b) calculating a transform in the frequency domain of said signal to obtain a sequence of samples;

c) acquiring a first and a second set of samples in said sequence of samples;

d) calculating the energies associated with said first and second set;

e) calculating a relative deviation between the energy of said first set and the energy of said second set; and f) comparing said relative deviation with at least a first predetermined threshold.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
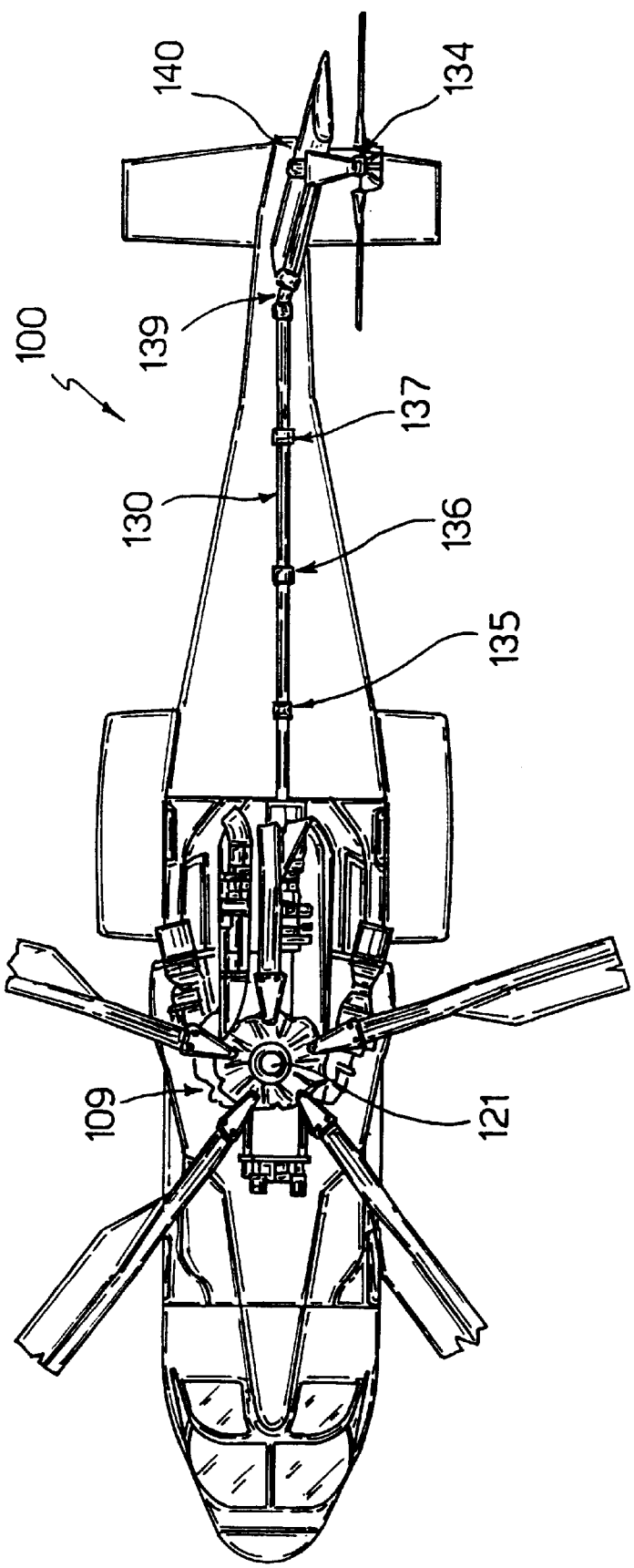
FIG. 1 shows a top plan view of a helicopter.
Figure 2:
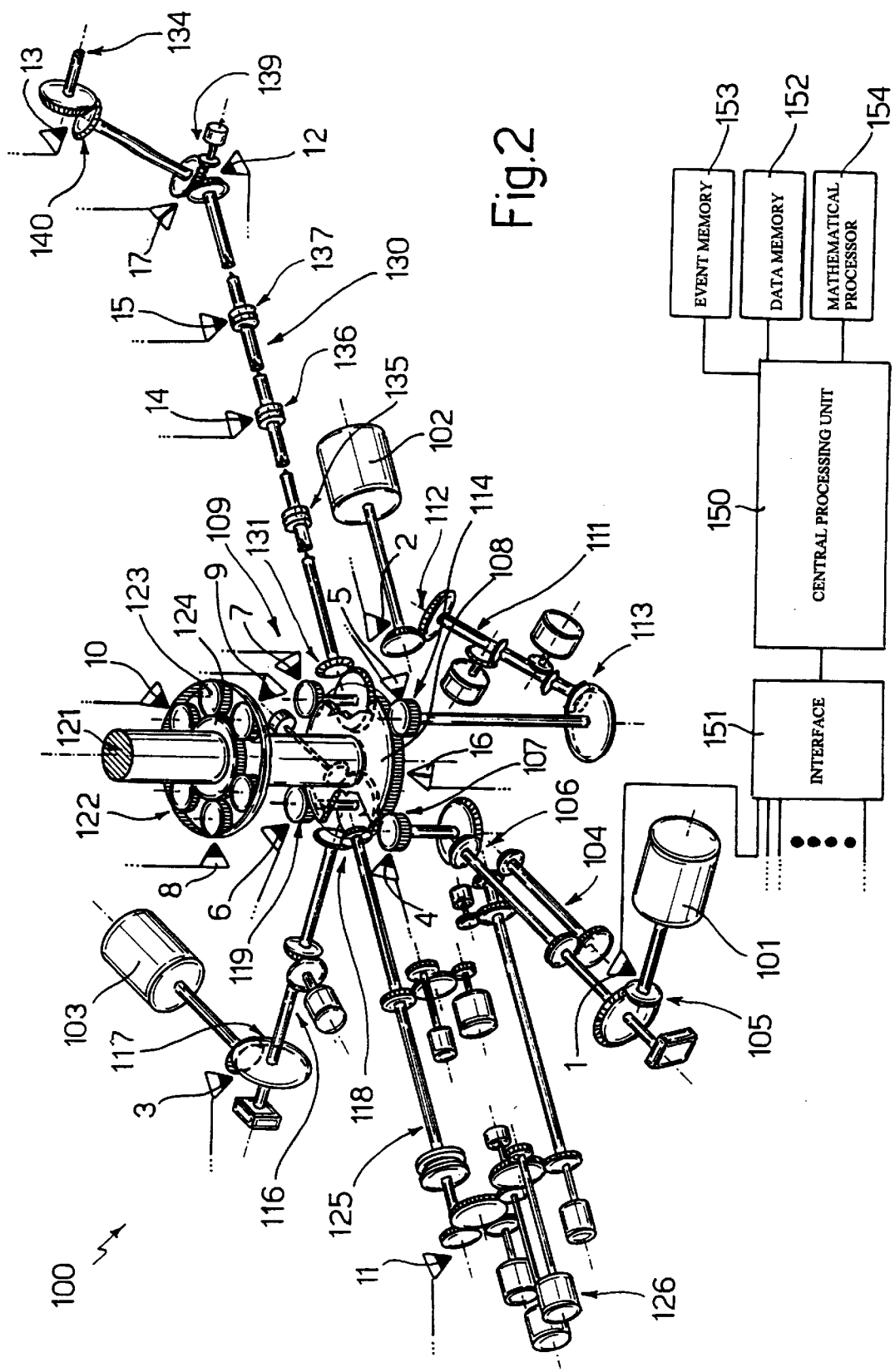
FIG. 2 shows a simplified diagram of the helicopter transmission and the location of various transmission member sensors.

FIGS. 1 and 2 show, schematically, the members of a helicopter 100 pertinent to the present invention.

In particular, helicopter 100 comprises a first engine 101, a second engine 102, and a third engine 103; first engine 101 is connected, by means of a first transmission line 104 comprising a first, second and third reducer 105–107, to an input gear 108 of a main gear assembly 109; second engine 102 is connected to input gear 108 by means of a second transmission line 111 comprising a fourth, fifth and sixth reducer 112–114; and third engine 103 is connected to input gear 108 by means of a third transmission line 116 comprising a seventh, eighth and ninth reducer 117–119.

Input gear 108 is connected to a rotor 121 of helicopter 100 by means of an epicyclic reducer 122 forming part of main gear assembly 109 and comprising six planet gears 123 and a sun gear 124; and input gear 108 is also connected—by means of a fourth transmission line 125 also connected to first transmission line 104—to an accessory box indicated schematically by 126, and to a fifth transmission line 130 connected to a tail rotor 134 and comprising a power take-off gear 131, intermediate joints 135–137, an intermediate gearbox 139, and a tail gearbox 140.

FIG. 2 shows fifteen acceleration sensors 1–15 and two azimuth sensors 16, 17 fitted close to the reduction stages as indicated in Table I below.

TABLE I

| Sensor | Pos. | Sensor. | Pos. | Sensor | Pos. |
|---|---|---|---|---|---|
| 1 | 105 | 7 | 131 | 13 | 140 |
| 2 | 112 | 8 | 122 (front) | 14 | 136 |
| 3 | 117 | 9 | 122 (right) | 15 | 137 |
| 4 | 107 | 10 | 122 (left) | 16 | 108 |
| 5 | 114 | 11 | 126 | 17 | 139 |
| 6 | 119 | 12 | 139 | | |

Helicopter 100 also comprises a data processing unit 150 connected to sensors 1–17 by an interface unit 151 for sampling and digitizing the sensor signals, and to a data memory 152, an event memory 153, and a mathematical processor 154.

The monitoring method described below provides, by analyzing the signals supplied by acceleration sensors 1–7, 12 and 13, for detecting mechanical or structural problems arising in flight. In particular, the method according to the invention is based on the principle of controlling the amount of energy contained in the first harmonic and successive harmonics of the signal of each sensor with respect to the total energy of the signal. In the event of a malfunction or fault, in fact, the sensor detects irregularities in the signal, which are manifested by the appearance of new spectral components or by an increase in the existing secondary spectral components, thus resulting in a reduction in the energy content of the component at fundamental frequency and in its harmonics.

The monitoring method described below provides for processing a signal s(t), supplied by whichever of acceleration sensors 1–7, 12, 13 is considered in each case, using a signal s1(t) supplied by the azimuth sensor on a shaft connected to the reducer monitored by the sensor in question (azimuth sensor 16 for acceleration sensors 1–7, and azimuth sensor 17 for acceleration sensors 12, 13). Signal s(t) is a vibratory signal (related to the rotation frequency of the shaft associated with the sensor in question) and is affected by random noise as well as by noise related to other nearby rotary members.

Signal s(t) differs and is processed differently according to whether it is generated by the associated gear, or is also affected by a further gear on the same shaft; which latter situation occurs when the second gear is at a sufficiently close distance from the sensor.

Figure 3A:
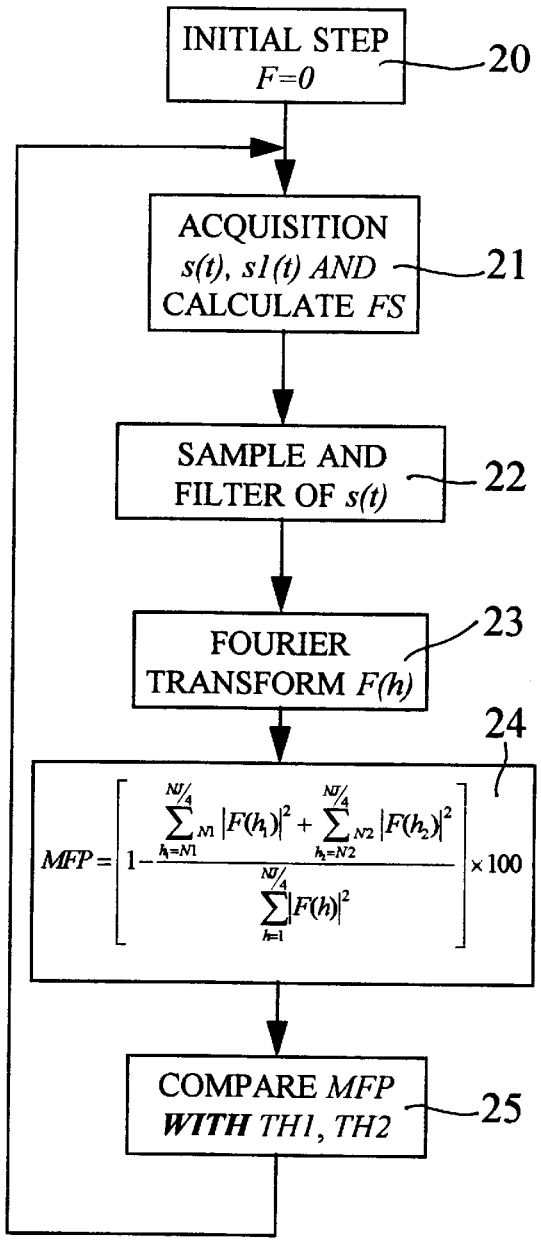
FIGS. 3–5 show flow charts of steps in the method according to the invention.

With reference to FIG. 3a, the method will first be described with reference to the second situation referred to above, i.e. in which the signal detected by the sensor is affected by both the associated gear and by a second gear on the same shaft. In which case, the sensor signal s(t) contains information relative to possible defects on both gears.

The method comprises an initial step, in which a variable F (explained later on with reference to FIG. 5) is set to a first predetermined value, e.g. 0 (block 20).

Signal s(t) and signal s1(t) are then acquired (block 21), and a sampling frequency FS is calculated by multiplying the frequency of azimuth sensor signal s1(t) by a memorized coefficient KT equal to the ratio between two prime whole numbers, and in particular correlated to the transmission ratio between the azimuth sensor shaft and the shaft monitored by the sensor in question, so that the resulting sampling frequency FS is correlated to the azimuth sensor frequency, and is such as to supply exactly NJ points (where NJ is a power of 2) of signal s(t) for each revolution of the monitored shaft.

Signal s(t) is then sampled at frequency FS and filtered by interface unit 151 to remove the random noise and nonsynchronous periodic components (block 22) and obtain a filtered signal $T_{1m}(i)$ defined by a number of samples. Signal s(t) is preferably sampled and filtered using the sequence of steps shown in FIG. 4 and described later on.

The Fourier transform F(h) of signal $T_{1m}(i)$ is then calculated (block 23), preferably using mathematical processor 154; and a relative noise energy parameter MFP is calculated (block 24) according to the equation:

$$MFP = \left[ 1 - \frac{\sum_{h_1=N1}^{NJ/4} N1|F(h_1)|^2 + \sum_{h_2=N2}^{NJ/4} N2|F(h_2)|^2}{\sum_{h=1}^{NJ/4} |F(h)|^2} \right] \times 100$$

where N1 and N2, which indicate both the spacing and the initial index values of the numerator summations, are the meshing frequency orders of the two monitored gears.

That is, parameter MFP compares the value of the energy contained in the signal components at the meshing frequencies and at their harmonics with the total energy of the signal to indicate the energy due to meshing irregularities, and varies between 0 corresponding to a theoretical condition of absolutely no noise or irregularity, and 100 corresponding to a theoretical condition in which signal s(t) contains no components at meshing frequency or at its harmonics. The value of MFP is therefore low when the monitored gears are operating correctly, and increases with respect to this value in the event of a fault or any irregularity.

Figure 5:
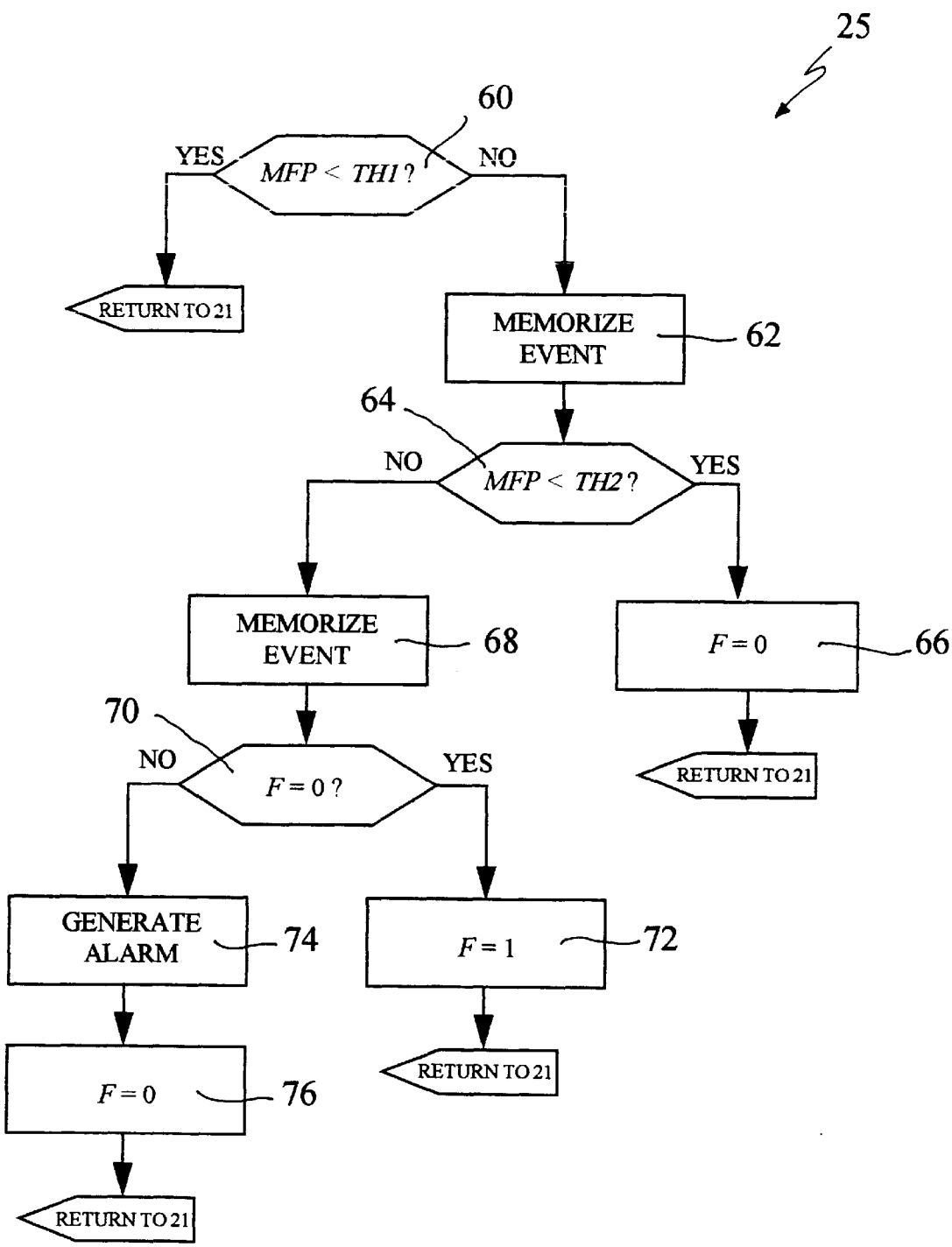

Central processing unit 150 then compares the resulting MFP parameter with two threshold values TH1, TH2 (where TH1<TH2) to generate, if necessary, alarm signals (block 25) according to the procedure described in detail later on with reference to FIG. 5, and block 25 then goes back to block 21 to continue monitoring with the next portion of signal s(t).

Figure 3B:
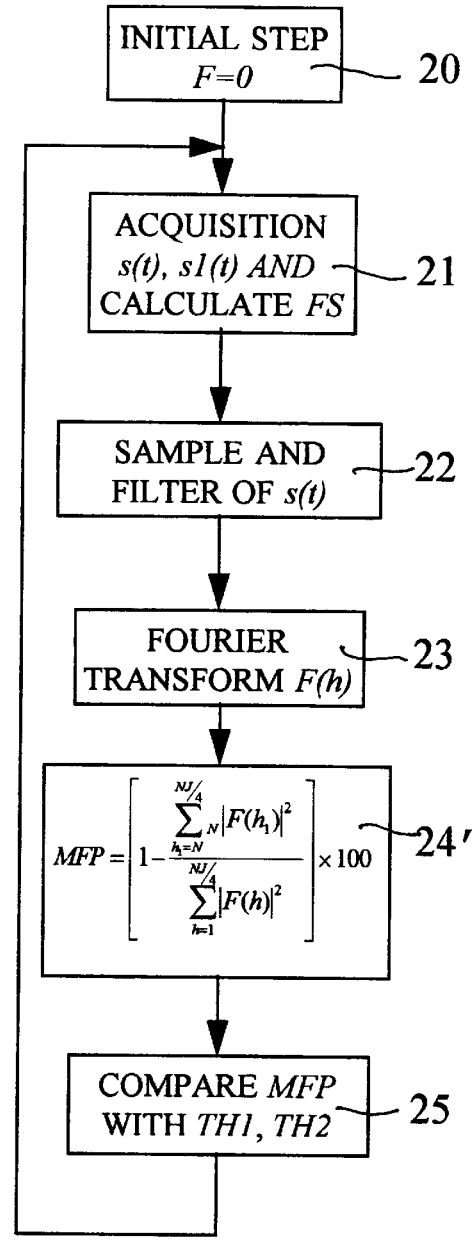

The FIG. 3b flow chart shows the steps in the method relative to the situation in which the sensor only detects the signal generated by the associated gear, the other gears being at such a distance as to have no effect on the signal, so that the information contained in signal s(t) applies solely to the gear monitored directly. As shown, the steps are the same as those described above, except that, after calculating the Fourier transform F(h) of signal $T_{1m}(i)$ (block 23), a simplified noise energy parameter MFP is calculated (block 24') according to the equation:

$$MFP = \left[ \frac{1 - \sum_{h_1=N}^{NJ/4} N|F(h_1)|^2}{\sum_{h=1}^{NJ/4} |F(h)|^2} \right] \times 100$$

where N, which indicates both the initial index value and the spacing of the numerator summation, is the meshing frequency order of the monitored gear.

In this case, too, central processing unit 150 compares parameter MFP with threshold values TH1, TH2 to generate, if necessary, alarm signals (block 25) according to the procedure described in detail later on with reference to FIG. 5, and block 25 then goes back to block 21 to continue monitoring with the next portion of signal s(t).

Figure 4:
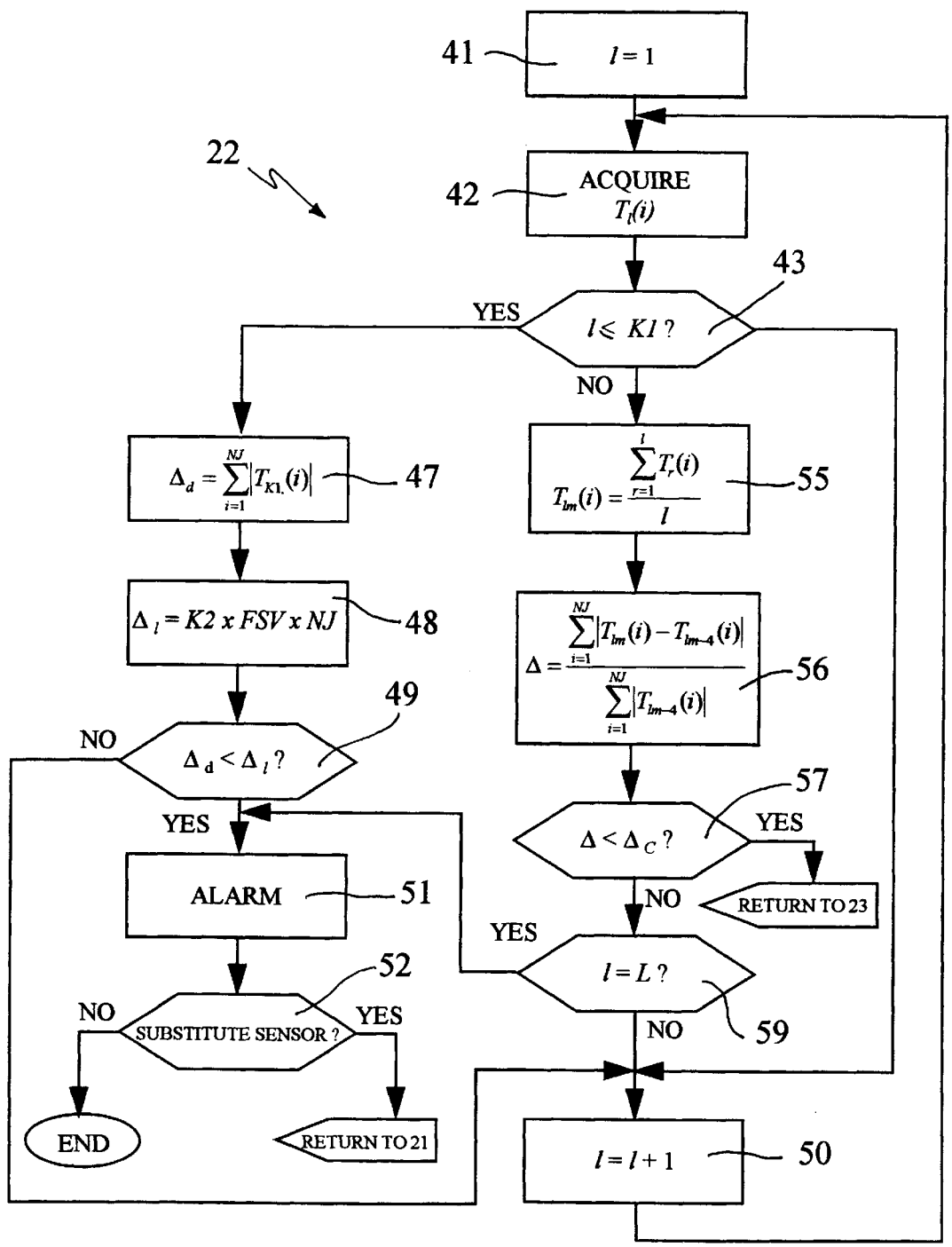

Sampling and filtering in block 22 are conveniently performed using the method described below with reference to FIG. 4.

To begin with, a revolution counter l is set to 1 (block 41); signal s(t) is sampled at previously defined frequency FS to obtain NJ points or samples $T_1(i)$ representing a synchronous vibratory time series relative to the sensor in question, to the respective shaft, and to each l-th revolution (block 42); the value of counter l, in particular whether it is less than or equal to a predetermined value K1, is determined (block 43); and, if counter l is less than or equal to K1 (performance of fewer than K1 iterations corresponding to the revolutions of the monitored shaft—YES output of block 43), the availability of the signal is determined by calculating (block 47) the sum $\Delta_d$ of the samples acquired at the l-th revolution, according to the equation:

$$\Delta_d = \sum_{i=1}^{NJ} |T_{Kl}(i)|$$

A limit value $\Delta_1$ is then calculated (block 48) according to the equation:

$$\Delta_1 = K2 \times FSV \times NJ$$

where FSV is the bottom-scale value, and K2 a predetermined constant much lower than 1; and a check is made (block 49) to determine whether the calculated sum $\Delta_d$ is less than the limit value $\Delta_1$. In the event of a negative response (NO output of block 49), the signal is considered to exist, counter l is increased (block 50), and block 50 goes back to block 42 to acquire further NJ points relative to the next revolution. Conversely (YES output of block 49), the signal is considered nonexistent and an alarm signal is generated (block 51); a check is made (block 52) to determine the presence of a substitute sensor (e.g. sensor 6 for sensors 4 and 5); in the event of a positive response (YES output of block 52), block 52 goes back to block 21 in FIGS. 3a,3b to repeat the procedure on the substitute sensor; and, in the absence of a substitute sensor, or if convergence is not reached even with the substitute sensor (NO output of block 52), the procedure is interrupted.

Conversely, if counter l is greater than K1 (performance of more than K1 iterations corresponding to the revolutions of the monitored shaft—NO output of block 43), block 43 goes on to a block 55, which calculates the average contiguous synchronous time series $T_{1m}(i)$ defining the filtered signal calculated in block 22, according to the equation:

$$T_{lm}(i) = \sum_{r=1}^{l} T_r(i) \quad i = 1 \ldots NJ$$

i.e. the mean value of each sample $T_1(i)$ over the l revolutions considered is calculated.

Convergence of the averaging process is then determined by calculating a convergence value $\Delta$ given by the sum, over all the samples, of the absolute value of the difference between the actual mean value of each sample and the mean value calculated in a previous revolution (at distance 4) divided by the sum of the mean samples in the previous revolution considered (at distance 4), according to the equation:

$$\Delta = \frac{\sum_{i=1}^{NJ} |T_{lm}(i) - T_{lm-4}(i)|}{\sum_{i=1}^{NJ} |T_{lm-4}(i)|}$$

where $T_{1m}(i)$ represents the i-th sample of the l-th iteration, and $T_{1m-4}(i)$ represents the i-th sample of the l-4-th iteration (block 56).

A check is then made to determine whether the calculated convergence value is less than or equal to a predetermined permissible minimum convergence value $\Delta_c$ (block 57). In the event of a positive response (YES output), the convergence process is interrupted, and block 57 goes back to the main program (block 23 in FIGS. 3a,3b). Conversely, a check is made to determine whether the averaging process has already been performed a predetermined maximum number of times L (block 59). If the iteration (revolution) counter l is less than L (NO output), the counter is increased (block 50) and the operations described above are repeated. Conversely (YES output), the procedure for generating an alarm signal and possibly repeating the procedure with a substitute sensor, as described with reference to blocks 51–52, is repeated.

The threshold comparison and alarm generating step in block 25 of FIGS. 3a and 3b is conveniently performed as described below with reference to FIG. 5.

To begin with, parameter MFP, calculated as described in block 24 of FIG. 3a or block 24' of FIG. 3b, is compared with first threshold TH1 (block 60); if MFP<TH1 (YES output), block 60 goes back to block 21 in FIGS. 3a,3b to continue monitoring with the next group of samples; conversely, if threshold TH1 has been exceeded (NO output of block 60), the event is memorized in event memory 153 (block 62) and MFP is compared with second threshold TH2 (block 64). If MFP<TH2 (YES output of block 64), variable F (initialized in block 20 of FIGS. 3a, 3b to memorize whether threshold TH2 has already been exceeded) is set to (or confirmed at) the first predetermined value, 0 in the example shown (block 66), and block 66 goes back to block 21 of FIGS. 3a,3b to continue monitoring with the next group of samples. Conversely (NO output of block 64), the event is memorized in event memory 153 (block 68) and the value of variable F is determined (block 70). In particular, if variable F is at the first predetermined value (YES output), F is set to a second predetermined value, e.g. 1, (block 72), and block 72 goes back to block 21 of FIGS. 3a,3b to continue monitoring with the next group of samples. Conversely, if variable F is at the second predetermined value, i.e. threshold TH2 has already been exceeded (NO output of block 70), a pilot alarm signal is generated (block 74), variable F is again set to the first predetermined value (block 76), and block 76 goes back to block 21 of FIGS. 3a, 3b to continue monitoring with the next samples.

Crossover of both the first and second threshold by parameter MFP indicates a redistribution of the energy of the detected signal in favour of components at a frequency other than the first harmonic (i.e. other than the meshing frequency), which situation arises in the presence of problems in the monitored structure.

The method described has the advantage, by controlling the various sensors installed, of monitoring the various structural parts of the helicopter instant by instant, and so detecting incipient mechanical or structural problems which may result in vibration or unbalance in turn resulting sooner or later in failure of the monitored gear.

Clearly, changes may be made to the method as described and illustrated herein without, however, departing from the scope of the present invention. In particular, the filtering and averaging procedure and the alarm generating procedure may differ from those described.

What is claimed is:

1. A method of monitoring a transmission assembly of a vehicle equipped with acceleration sensors, comprising the steps of:

a) acquiring a signal from an acceleration sensor mounted on the transmission assembly for detecting the acceleration of a moving member of the transmission assembly;

b) calculating a transform in the frequency domain of said signal to obtain a sequence of samples;

c) acquiring a first and a second set of samples in said sequence of samples;

d) calculating the energies associated with said first and second set;

e) calculating a relative deviation between the energy of said first set and the energy of said first set and the energy of said second set;

f) comparing said relative deviation with at least a first predetermined threshold; and g) generating an alarm signal if said relative deviation exceeds said at least a first predetermined threshold.

2. A method as claimed in claim 1, characterized in that said transform is a Fourier transform.

3. A method as claimed in claim 1, characterized in that said sensor is associated with a shaft comprising at least a first and a second gear; and in that said signal is related to the rotation frequencies of said first and second gear; said first set comprising samples at the meshing frequencies of said first and second gear, and samples at the harmonic frequencies of said meshing frequencies; and said second set comprising the whole sequence of samples.

4. A method as claimed in claim 3, characterized in that said step of calculating a relative deviation comprises calculating a quantity MFP according to the equation:

$$MFP = \left[1 - \frac{\sum_{h_1=N1}^{NJ/4} N1|F(h_1)|^2 + \sum_{h_2=N2}^{NJ/4} N2|F(h_2)|^2}{\sum_{h=1}^{NJ/4} |F(h)|^2}\right] \times 100$$

where F(h) is the Fourier transform of said signal, and N1 and N2, which indicate both the spacing and the initial index values of the numerator summations, are the meshing frequency orders of said first and second gear.

5. A method as claimed in claim 1, characterized in that said sensor is connected to a shaft comprising a third gear; and in that said signal is related to the rotation frequency of said third gear; said first set comprising samples at the meshing frequency of said third gear, and samples at the harmonic frequencies of said meshing frequency; and said second set comprising the whole sequence of samples.

6. A method as claimed in claim 5, characterized in that said step of calculating a relative deviation comprises calculating a quantity MFP according to the equation:

$$MFP = \left[ \frac{1 - \sum_{h_1=N}^{NJ/4} {}_N|F(h_1)|^2}{\sum_{h=1}^{NJ/4} |F(h)|^2} \right] \times 100$$

where F(h) is the Fourier transform of said signal, and N, which indicate both the spacing and the initial index value of the numerator summation, is the meshing frequency order of the shaft monitored by the sensor.

7. A method as claimed in claim 1, characterized by repeating said steps from a) to f) for a number of iterations.

8. A method as claimed in claim 1, characterized in that said step of calculating a transform is preceded by a step of sampling and filtering said signal.

9. A method as claimed in claim 8, characterized in that said step of sampling and filtering comprises the steps of:

acquiring a number of synchronous samples $T_1(i)$ for each revolution of a shaft associated with said acceleration sensor; and calculating an average time series $T_{1m}(i)$ according to the equation:

$$T_{lm}(i) = \sum_{r=1}^{l} T_r(i) \quad i = 1 \ldots NJ$$

where $T_1(i)$ is said synchronous samples, and l is a counter for counting the number of revolutions of said shaft.

10. A method as claimed in claim 9, characterized in that said step of calculating an average time series is preceded by a step of determining the presence of significant signal values.

11. A method as claimed in claim 9, characterized in that said step of calculating an average time series is followed by a step of determining convergence of said average time series.

12. A method as claimed in claim 1, characterized in that said step of comparing said relative deviation (MFP) also comprises the step of comparing said relative deviation with a second threshold (TH2).

* * * * *